United States Patent
Stelter

(10) Patent No.: US 6,737,602 B2
(45) Date of Patent: May 18, 2004

(54) EDM APPARATUS AND METHOD INCORPORATING COMBINED ELECTRO-EROSION AND MECHANICAL SAWING FEATURES

(76) Inventor: Brian Stelter, 11005 Hensell Rd., Holly, MI (US) 48442

( * ) Notice: Subject to any disclaimer, the term of this patent is extended or adjusted under 35 U.S.C. 154(b) by 0 days.

(21) Appl. No.: 10/253,463

(22) Filed: Sep. 24, 2002

(65) Prior Publication Data

US 2004/0056003 A1 Mar. 25, 2004

(51) Int. Cl.⁷ .................. B23H 5/04; B23H 7/02
(52) U.S. Cl. .................................... 219/69.12
(58) Field of Search ............................ 219/69.12

(56) References Cited

U.S. PATENT DOCUMENTS

| | | | |
|---|---|---|---|
| 3,686,934 A | 8/1972 | Farrand et al. ............ 86/1 |
| 3,927,293 A | 12/1975 | Bell, Jr. ................ 219/69 C |
| 4,301,349 A | * 11/1981 | Inoue ................ 219/69.12 |
| 4,367,392 A | 1/1983 | Girardin ............... 219/69 W |
| 4,386,248 A | * 5/1983 | Inoue ................ 219/69.12 |
| 4,418,263 A | 11/1983 | Inoue ............... 219/69 W |
| 4,611,107 A | * 9/1986 | Inoue ................ 219/69.12 |
| 4,766,280 A | 8/1988 | Groos ............... 219/69 W |
| 4,798,929 A | * 1/1989 | Itoh .................. 219/69.13 |
| 4,977,303 A | 12/1990 | Briffod ............... 219/69.12 |
| 5,046,563 A | 9/1991 | Engel et al. ............ 166/297 |
| 5,140,125 A | 8/1992 | Groos ............... 219/69.12 |
| 5,231,270 A | 7/1993 | Groos et al. ............ 219/69.12 |
| 5,506,382 A | 4/1996 | Derighetti ............ 219/69.12 |
| 6,016,753 A | 1/2000 | Glenn et al. ............ 102/307 |
| 6,113,343 A | 9/2000 | Goldenberg et al. ....... 414/729 |
| 6,225,589 B1 | 5/2001 | Bartok ............... 219/69.15 |

FOREIGN PATENT DOCUMENTS

| | | | |
|---|---|---|---|
| JP | 62-54624 A | * | 3/1987 |
| JP | 62-68224 A | * | 3/1987 |

* cited by examiner

Primary Examiner—Geoffrey S. Evans
(74) Attorney, Agent, or Firm—Gifford, Krass, Groh, Sprinkle, Anderson & Citkowski, P.C.

(57) ABSTRACT

A system and method for accomplishing combined electro-erosion and mechanical cutting of a workpiece which includes an outer metallic jacket and a non-metallic inner core. An elongated wire electrode is provided and is unwound from a supply spool through a pair of forming rollers, during which a specified polygonal and cross sectional shape with a textured outer surface is imparted upon the electrode. Pairs of feed rollers are located to each of supply and take-up sides relative the workpiece, and with the electrode being guidably extended between each of the pairs of rollers. Tensioning rollers are also located on each of the feed and take-up sides of the electrode. An electrical current generating and delivery component is provided in communication with the electrode which electro-erodes the outer metallic jacket of the workpiece. The textured surface of the electrode preferably exhibits teeth which mechanically abrade, when advanced longitudinally in relation to the workpiece, its inner core and in order to cut through and section the inner core.

21 Claims, 2 Drawing Sheets

EDM APPARATUS AND METHOD INCORPORATING COMBINED ELECTRO-EROSION AND MECHANICAL SAWING FEATURES

BACKGROUND OF THE INVENTION

1. Field of the Invention

The present invention relates generally to electrical discharge machining technologies and applications. More particularly, the present invention discloses an EDM apparatus and method for accomplishing combined electro-erosion and mechanical sawing of such as explosive ordinance having an outer steel casing surrounding such as a granular (RDX) or epoxy based explosive.

2. Description of the Prior Art

The prior art is well documented with sundry examples of electrical discharge machining (EDM) apparatuses and methods. As is generally known in the art, the objecting of EDM technology is to accomplish, such as through the provision of a suitably configured and constructed wire, electro-erosion cutting of a specified workpiece. The workpiece is further typically consisting of a metallic based material amenable to spark erosive cutting by the wire, and upon passing a current through the wire which is arced to the workpiece, and so that, upon immersing the workpiece in a suitable electrically conductive and coolant/fluidic bath, eroded portions of the workpiece are carried away from the cutting zone established by the eroding wire.

Numerous applications of EDM technology are further known, such as alternative shaping and configuration of the wire electrode, and one example of this is disclosed in U.S. Pat. No. 4,766,280, issued to Groos. The Groos reference teaches providing projections and recesses in an electrode wire created by twisting the wire electrode, selected from a variety of polygonal cross sectional shapes such as square, rectangle, triangle, hexagon, etc., about its axis.

U.S. Pat. No. 4,418,263, issued to Inoue, teaches a combined method and apparatus for electroerosively wirecutting a conductive workpiece with a continuous wire electrode and which, in particular, includes the steps of feeding the wire electrode from a supply reel and subsequently shaping the electrode into a cross sectional contour (including such as square or triangular shapes) which is preselected in conjunction with the desired pattern of cut to be formed in the workpiece. The shaping means incorporated into Inoue '263 may take the form of a drawing die or an electro-erosive wire-cutting electrode assembly.

A yet further subset category of EDM references deal with coating applications applied to the electrode wire and one example of this is set forth in U.S. Pat. No. 4,977,303, issued to Briffod which teaches coating a copper wire core with zinc, heating in an oxidizing atmosphere to simultaneously provide a copper-zinc-alloy layer over the copper core and a zinc oxide surface on the alloy layer. The oxide and alloy coated wire is then reduced in diameter to reduce the thickness of the alloy layer by about one-half of its initial thickness, the resulting electrode wire permitting a greater current density and a greater tractional force to be employed, yielding increased machining speed in the EDM process.

A final subset category of prior art, heretofore non-EDM related, deals with explosive disarming and decommissioning, in particular of shells or other hardened outer casings filled with explosive. A first example of a material-energized plasticized metal slug cutter for use within tubular cylinders, pipe or like structure, is set forth in U.S. Pat. No. 6,016,753, issued to Glenn. The cutter in Glenn includes the provision of explosive material initially disposed in a particular hourglass or dog-bone shape surrounded by a layer of explosive-plasticizable copper or similar material which becomes both heated to plasticity and imparted with kinetic energy upon explosive material detonation.

The hourglass/dog-bone shape of the explosive material provides focus or shaping of the copper metal into a confined slug pattern, enabling a clean and relatively low expended-energy cutting of a surrounding tubular cylinder into axial segments. The cutter further employs a cutting action inclusive of spalling at the outer surface of the cut tubing opposite the region of slug impact. Scaling of explosive material sizes, weights and shaped for differing tubular cylinder dimensions is disclosed along with a mathematical algorithm usable in cutting action prediction.

Finally, U.S. Pat. No. 6,113,343, issued to Goldenberg et al., teaches an explosives disposal robot having a wheeled platform with a winder mechanism and a turret mechanism carrying at least one manipulator arm, the arm in turn including such as an aiming and disrupter mechanism and a relocatable surveillance camera. In further relevant part, the robot is capable of controlled movement to or from a hazardous site and to either remove or destroy a target. A wrist and gripper mechanism employed with the robot operates, in combination with any or all of the described extension links, to facilitate dexterous operation.

SUMMARY OF THE PRESENT INVENTION

The present invention teaches an EDM apparatus and method for accomplishing combined electro-erosion and mechanical sawing of explosive ordinance (explosives decommissioning), and such as further including an outer steel casing surrounding such as a granular (RDX) or epoxy based explosive and with the further provision of a detonator located at the head of the steel casing and communicable with the explosive material. The particular advantage of the present invention is that it provides a wire electrode which is both constructed and configured so that it serves the dual function of electro-erosive EDM cutting of the surrounding and metallic based jacket of the shell, combined with mechanical sawing (abrasion cutting) of the RDX or epoxy based explosive contained within the shell and in particular to safely sever from the shell the detonator located at the head of the shell.

An elongated wire electrode is provided and which is typically unreeled in a generally circular cross sectional shape from a supply spool. The wire electrode is, as is known in the art, constructed of an electrically conductive metallic composition and, in one preferred application, may further include an outer and softer layer of metal and an inner core of a harder metal.

Forming rollers are provided for imparting a desired and further polygonal cross sectional shape to the wire electrode. Opposing and guiding/forming surfaces of the rollers are further configured, in one application, to impart a triangular cross sectional shape to the wire electrode, as well as in addition texturing the outer surfaces of the electrode such that the textured surface further exhibits a plurality of individual teeth.

Pairs of feed and take-up rollers are positioned on opposite sides of the workpiece and such that the wire electrode is guidably extended between each of the pairs of rollers in a direction generally perpendicular to a machining zone defined in relation to the workpiece. During the machining stage, an electrical current is passed to the electrode, typically through one of the feed or take-up rollers, and in order to generate a desired ionization channel or arc relative to the outer metal jacket of the shell and to electro-erode/section the metal. A die-electric bath may also be provided and, in combination with the particular electrical components and variables of current and voltage delivered to the machining zone, prevent inadvertent detonation of the shell during decommission machining.

Upon successfully piercing/sectioning the outer jacket, the configured teeth of the electrode abrade against the inner RDX (or other suitable non-metallic and explosive core interior) material and so that, upon continuous advancing of the wire electrode across the machining zone, the teeth mechanically section the inner core, contemporaneous with the electro-erosion of the outer/annular configured metallic jacket layer, and in order to section a portion of the shell containing the detonator, thereby decommissioning the shell.

A pair of pulling pinch rollers are arranged subsequent to the take-up rollers and re-direct the used electrode to a take up spool for rewinding and disposal. Tensioning members are located; upon both the feed and take-up sides of the electrode and are preferably provided in the form of potentiometer rollers, such as located between the reel spool and forming rollers and between the take-up rollers and pulling pinch rollers, respectively. Additional features include an advancing head mechanism for actuating the wire electrode in a direction substantially perpendicular to an extending length across the machining zone and so that the system can provide combined advancement/retraction of the electrode wire, combined with its continuous longitudinal and redirecting advancement between the spools and across the various forming, feed, take-up, pinching and tensioning rollers.

A method for accomplishing combined electro-erosion and mechanical cutting of the workpiece/explosive shell is also disclosed and includes the steps of unreeling a supply of the elongated wire electrode, forming the specified polygonal and cross sectional (e.g., triangular) shape of the electrode contemporaneous with texturing the outer surface of the electrode with such as a plurality of individual-teeth. Additional steps include guidably advancing, in longitudinal fashion, the wire electrode across a machining zone defined between the wire electrode and the workpiece, supplying the electrical current to the electrode to create the desired electrical arc within the machining zone, and sectioning the RDX inner core upon the advancement and abrasion of the teethed outer surfaces of the electrode against and through the inner core. Yet additional method steps include the immersing of the machining zone with the die-electric fluid, as well as perpendicular advancement of the electrode across the machining zone and through the diameter of the shell.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
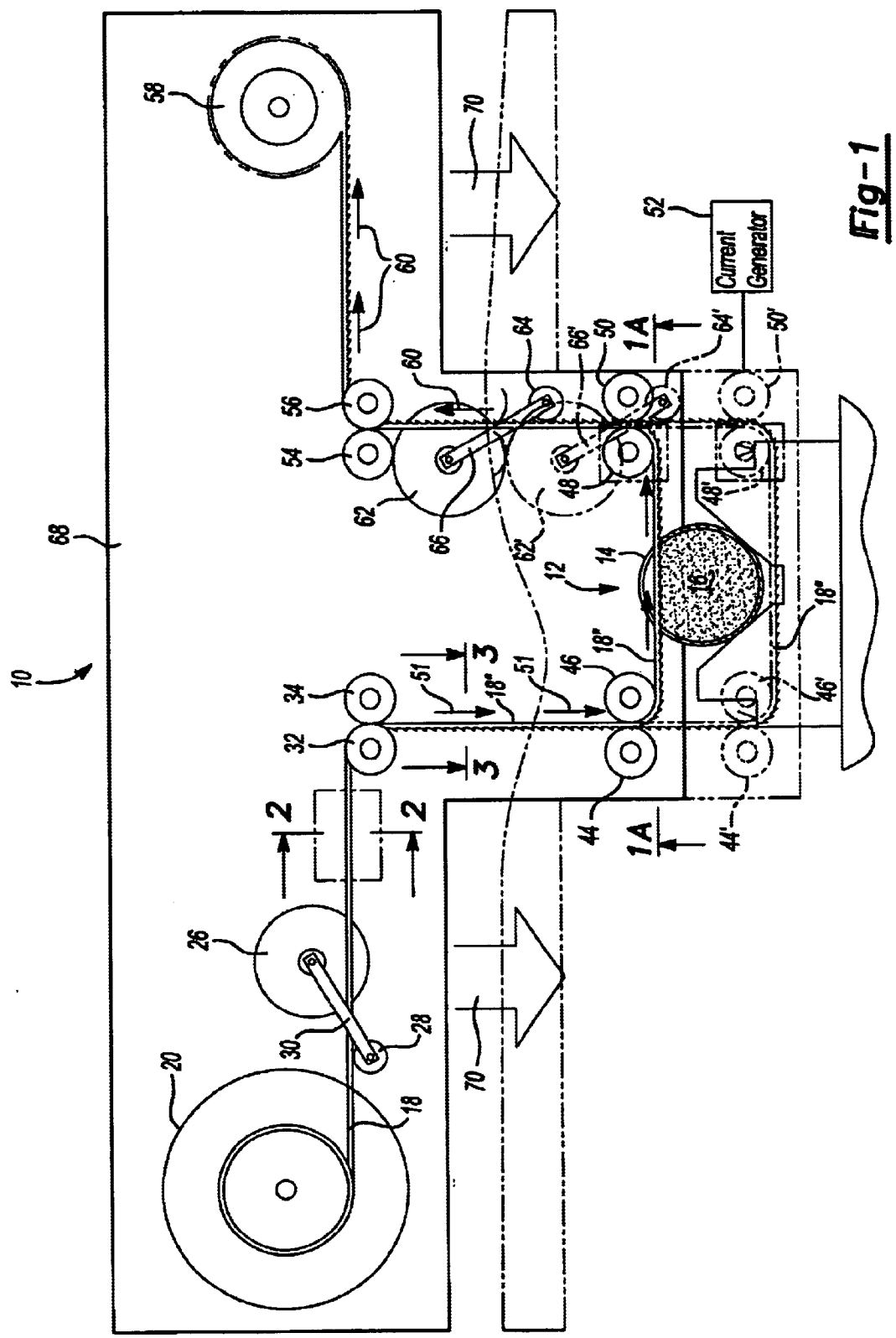
FIG. 1 is a schematic illustration of the method and apparatus for effectuating combined electro-erosive cutting of the ordinance shell jacket exterior, as well as mechanical sawing of the internally contained explosive according to the present invention.

Referring now to FIG. 1, a system is illustrated schematically at 10 for providing combined electro-erosion and mechanical cutting of a workpiece, see generally at 12, according to the present invention. As further previously explained, the present invention teaches an EDM apparatus and method for accomplishing combined electro-erosion and mechanical sawing of the workpiece 12 in the form of an explosive ordinance (explosives decommissioning), such shell further including an outer steel casing 14 surrounding such as a granular (RDX) or epoxy based explosive inner core 16. Although not shown, it is further understood that the explosive shell 12 with the further provision of a detonator (such as with the outer layer being composed of a depleted uranium material) located at a head of the outer steel casing 14 and which extends into and is communicable with the explosive core material 16.

Figure 1A:
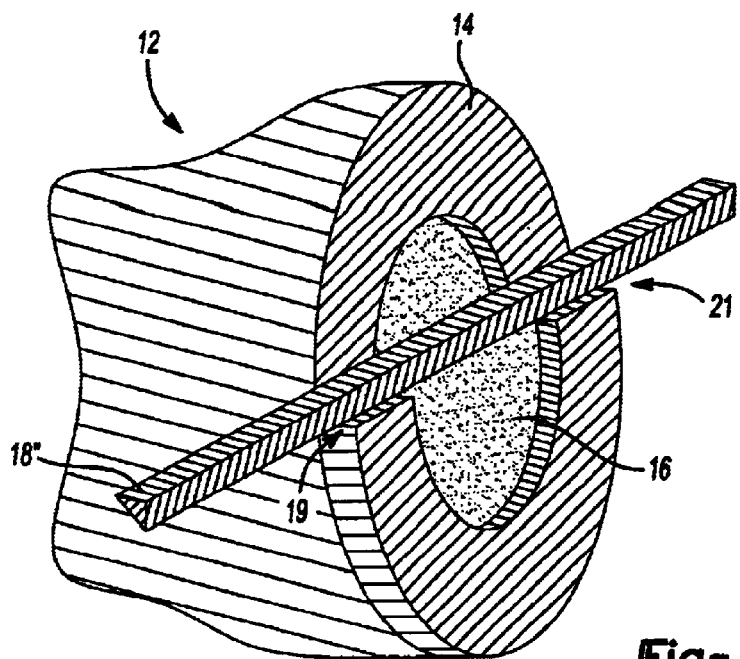
FIG. 1A is a cross sectional cutaway in perspective, taken along line 1A—1A of FIG. 1, and illustrating the manner in which the formed electrode EDM machines the outer metal jacket in non-contacting fashion, concurrent with abrading mechanical sawing of the non-conductive interior explosive composition.

As further previously described, and which will now be explained in more specific detail, the particular advantage of the present invention is that it provides a wire electrode 18 which is both constructed and configured so that it serves the dual function of electro-erosive EDM cutting of the surrounding and metallic based jacket 14 of the shell 12, combined with mechanical sawing (abrasion cutting) of the RDX or epoxy based explosive 16 contained within the shell and in particular to safely sever from the shell the detonator (again not shown) located at the head of the shell. FIG. 1A further illustrates a cross sectional cutaway of the explosive shell 12, with surrounding metal based jacket 14 and inner non-conductive explosive core 16, the same being progressively sectioned by the travel of a formed electrode wire 18" (as will be subsequently described in more detail). In particular, the illustration of FIG. 1A illustrates the existence of a gap, see for example at 19 and 21, existing at all times between the wire 18" and the outer metal jacket 14 during EDM machining. Concurrent with electro erosion of the outer sleeve portions of the jacket 14, the formed wire electoxide 18" progressively and mechanically abrades (saws) through the inner RDX or other suitable non-conductive explosive core 16 and in such as a fashion as to progressively section off a portion, typically a detonator (not shown), located at a tip of the shell 12. Although not illustrated herein, it is further understood that the system and apparatus of this invention is typically mounted upon portable and remote operable platform, such as a robot or the like, and which incorporates a user operable interface to allow for safe and remote operation and manipulation of the system, these features not again being particularly illustrated for purposes of this description.

Figure 2:
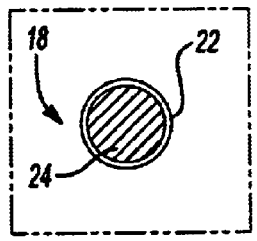
FIG. 2 is a first cutaway view, taken along line 2—2 of FIG. 1, and illustrating an initial, preferably round, cross sectional configuration of the wire electrode upon the same being initially unreeled from a supply spool.

Referring again to FIG. 1, as well as to FIG. 2, the elongated wire electrode is again initially illustrated at 18 and which is provided in generally wound fashion upon a supply reel 20. The wire electrode in its initial configuration 18 is provided in a generally circular cross sectional shape as unreeled from a supply spool 20. The wire electrode 18 may be constructed of any suitable metallic composition, exhibiting the desired degree of electrical conductivity. In a desired application, and referring in particular to the cut-away view of FIG. 2, the electrode wire 18 is constructed with a first outer and softer layer of metal 22 (such as for example brass) and which surrounds an inner core 24 of a harder metal (such as for example steel). It is also however understood that the material composition of the wire electrode is not critical and that both composite and solid wires can be employed within the scope of the present invention.

As will also described in additional detail, a first tensioning member is provided in the form of a first of a pair of potentiometer rollers, the first referenced of which including a fixed element 26 from which a tensioning roller 28 extends and which is interconnected through a pivot arm 30. One key aspect of the system and method of the present invention is the ability to properly tension the electrode wire in application and this feature is provided in significant part by the tensioning members.

Figure 6:
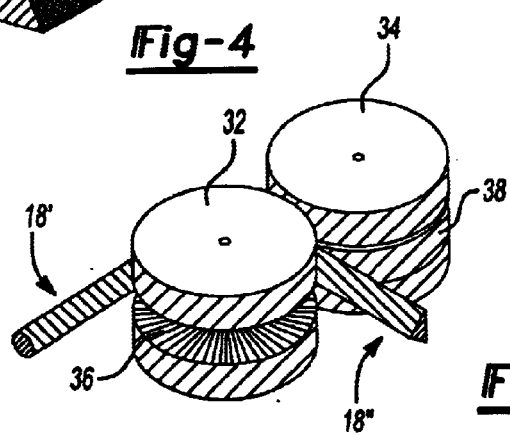
FIG. 6 is a further sectional view, again in perspective, of the forming rollers and illustrating the manner in which the wire electrode is formed from its initial circular to subsequent triangular polygonal shape according to the present invention.

Referring again to FIG. 1, as well as to the sectional perspective of FIG. 6, forming rollers 32 and 34 are provided for imparting a desired and further polygonal cross sectional shape to the wire electrode. In particular, opposing and guiding/forming surfaces of the rollers 32 and 34 are illustrated by an annular extending and triangular recessed shape (at 36 for roller 32) and a substantially level, annular shaped and anvil surface (at 38 for roller 34) for imparting a triangular cross sectional shape to wire electrode.

Figure 3:
FIG. 3 is a second cutaway view, taken along line 3—3 of FIG. 1, and illustrating a cross sectional and triangular formed configuration of the wire electrode upon being passed through a pair of opposing and forming rollers.
Figure 4:
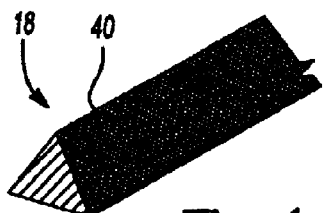
FIG. 4 is a sectional perspective of the formed wire electrode also shown in FIG. 3 and illustrating, in particular, one desired tooth pattern imparted by the forming rollers and according to the present invention.
Figure 5:
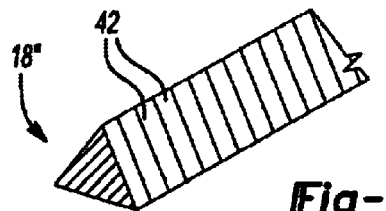
FIG. 5 is a sectional perspective of the formed wire electrode according to a further and preferred tooth pattern imparted by the forming rollers according to the present invention.

Further, and specifically referring to the cutaway view of FIG. 3 and the sectional perspective of FIG. 4, a first possible reshaping of the wire electrode is illustrated at 18' and which includes the triangular shape along with an additional texturing of the surfaces of the electrode in the manner of a knurled or file-like pattern 40. While further being capable of texturing or imparting any desired surface configuration, such as including helical, spiral, grooved rings, straight teeth, or diamond patterns, a preferred example of a reshaped wire is illustrated also in FIG. 5 at 18" and in which the knurled pattern 40 is replaced by a plurality of individual, and spaced apart teeth 42.

Reference is also made to the teethed patterns defined along each of the opposing surfaces of the roller shaped recesses 36 and 38, (see again FIG. 6) and which result in the spiraled teeth 42 imparted upon the reshaped electrode. It is also envisioned that the reshaped cross section of the electrode wire can also adopt half-round, round with flat, ribbon, square or other potential polygonal and/or irregular patterns.

It is also envisioned that, in certain applications the forming rollers 32 and 34 can be dispensed and the wire electrode provided in an appropriately reeled capacity in its completed shape (18' or 18"). However, and for purposes of the preferred embodiments, it has been determined to be advantageous to re-form or reshape common wire electrode stock on site and in response to a desired cross sectional shape and surface pattern, this in turn being responsive to the type of shell being cut/decommissioned, the nature of the current supply/electrical input, and the like. Along these lines, it is envisioned that either the forming rollers 32 and 34, or annular inserts associated with their opposing and re-forming recesses, can be replaceable to achieve a desired reshaping, accommodated a different gauge wire electrode, or both.

Upon being reshaped, such as again into the desired shape and pattern illustrated at 18", the electrode wire is redirected and fed through a first pair of feed rollers, 44 and 46, and a second pair of take-up rollers 48 and 50. The pairs 44 & 46 and 48 & 50 are positioned on opposite sides of the workpiece/shell 12 and such that the wire electrode 18" is guidably extended between each of the pairs of rollers in a direction generally perpendicular to a machining zone defined in relation; to the shell 12.

Combined with the appropriate tensioning of the wire electrode 18", it is also desired that an appropriate feed rate be achieved and, in one application, such a feed rate is provided according to a range of between 2" (inches) to 30" (inches) of wire per minute. Reference is also made to directional arrows 51 which reference the general direction of the electrode wire as it is fed through the apparatus. Other feed rates of the electrode wire are also possible and, as will be subsequently described, the invention relies upon an adequate interfacing of feed tension and current delivery to the wire electrode and in order to effectively section (decommission) the explosive shell 12 without the incidence of accidental detonation.

During the machining stage, an electrical current is passed to the electrode, and such as is referenced in FIG. 1 by a current generating and delivery component 52 which is communicable through one of the feed or take-up rollers (preferably a selected take up roller 48 or 50). Although not further described herein, particular current generating circuitry is employed to create a current flow of desired amperage and voltage to the wire 18" and so that an ionization channel (spark or arc) is created across from the electrode wire 18" to the outer jacket layer 14 of the shell 12, and in order to electro-erode/section the metal layer 14.

A die-electric bath (not shown) may also be provided either in immersing fashion or as a spray and, in combination with the particular electrical components and variables of current and voltage delivered to the machining zone, prevents inadvertent detonation of the shell during decommission machining. Although not further shown, it is understood that, concurrent with the machining processes occurring as described above, clamps are applied around the body (exterior metal jacket 14) of the shell/ordinance 12 to immobilize the same. Additionally, an electric charge is applied to the outer casing 14 and in order to electrically ground the shell during electro-erosive machining.

Upon successfully piercing/sectioning the outer jacket 14, the configured teeth (see again the example of teeth 42 for re-shaped electrode wire 18") abrade against the inner RDX (or other suitable non-metallic and explosive core interior)

material 16 and so that, upon continuous advancing of the wire electrode across the machining zone according to the desired feed rate, the advancing teeth 42 mechanically section the inner core 42. It is further understood that, given the annular nature of the shell casing 14, the abrading/cutting of the inner core 16 occurs contemporaneous with the electro-erosion of the outer/annular configured metallic jacket layer 14, and in order to section off a head portion of the shell (again not shown) containing the detonator, thereby decommissioning the shell 12.

Upon passing through the machining zone (again noted to be that area where the electrode wire 18" interfaces with the shell 12) a pair of pulling pinch rollers 54 and 56 are arranged subsequent to the take-up rollers 48 and 50 and re-direct the used electrode 18" to a take up spool 58 (see also additional directional arrows 60 consistent with the direction of arrows 51 referenced between the forming rollers 32 & 34 and the feed rollers 44 & 46) for rewinding and disposal. Although not shown, it is also envisioned that the take-up spool 58 can be substituted by a collection bin or other suitable enclosure for holding and retaining the used wire electrode.

As with the tensioning member previously referenced, an additional and second potentiometer/tensioning roller member is located at take-up side of the electrode and again includes a fixed element 62 from which a tensioning roller 64 extends and which is interconnected through a pivot arm 66. As is further envisioned, the first potentiometer roller (26, 28, and 30) is provided as a brake tension member on the supply side of the assembly, whereas the second potentiometer member (62, 64 and 66) is preferably provided as a pulling tension member.

Additional features of the present invention include an advancing head mechanism, see general depiction at 68 in FIG. 1, which is understood to define a component of the mobile and platform supported robot (again not shown) and for actuating the wire electrode in a direction substantially perpendicular to an extending length across the machining zone. Reference is made in particular again to FIG. 1 and which illustrates the advancing (as well as retracting) nature of the electrode 18" (see arrows 70), by virtue of the feed rollers (advanced to position 44' and 46"), take-up rollers (see also at advanced positions 48' and 50") and in addition to the second pulling tension potentiometer member (as shown at advanced positions 62', 64' and 66"). It is again understood that the system can provide combined advancement/retraction of the electrode wire, combined with its continuous longitudinal and redirecting advancement between the spools 20 and 52 and across the various forming, feed, take-up, pinching and tensioning rollers previously described herein.

Figure 7:
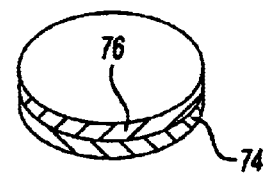
FIG. 7 is an illustration of an alternately configured workpiece, such including a first conductive layer and a second sandwiching and nonconductive layer, and capable of being sectioned by the apparatus and method according to the present invention.

Referring to FIG. 7, an alternatively configured workpiece is illustrated at 72 and which, in contrast to that illustrated at 16, in FIG. 1, is configured with a first conductive layer 74 and a second sandwiching and nonconductive layer 76. Accordingly, and unlike workpiece 16, the workpiece 72 does not include an outer conductive layer and an inner and non-conductive core, and the sandwiching first and second layers can further be provided in any order top or bottom.

Such applications, as most broadly indicated in FIG. 7, include medical or scientific applications, such as in the application of Teflon or epoxy-based coatings (nonconductive) over such as a titanium substrate (conductive). It is desirous in these instances to apply combined electro-erosive and mechanical sawing to neatly and cleanly section such workpieces (parts) 72, such as in particular biomechanical body replacement parts (i.e. hip bones, etc.). Other and additional scientific applications may include, from among other things, the sectioning of wafer-like parts from a mitt-shaped workpiece template. Any other type of workpiece, exhibiting any particular sandwiching layer configuration including both conductive and nonconductive layers, is also contemplated within the present invention.

A method for accomplishing combined electro-erosion and mechanical cutting of the workpiece/explosive shell is also disclosed and includes the steps of unreeling a supply of the elongated wire electrode, forming the specified polygonal and cross sectional (e.g., triangular) shape of the electrode contemporaneous with texturing the outer surface of the electrode with such as a plurality of individual teeth. Additional steps include guidably advancing, in longitudinal fashion, the wire electrode across a machining zone defined between the wire electrode and the workpiece, supplying the electrical current to the electrode to create the desired electrical arc within the machining zone, and sectioning the RDX inner core upon the advancement and abrasion of the teethed outer surfaces of the electrode against and through the inner core. Yet additional method steps include the immersing of the machining zone with the die-electric fluid, as well as perpendicular advancement of the electrode across the machining zone and through the diameter of the shell.

Having described my invention, additional preferred embodiments will become apparent to those skilled in the art to which it pertains. In particular, the feed rates disclosed herein can be accelerated when sectioning such as a graphite based workpiece. Additional applications, including aerospace, medical and military are envisioned which incorporate the system and method disclosed herein. It is further envisioned that the dielectric bath can be modified to provide improved flushing of the electro-eroded/mechanically sectioned portions of workpiece material. It is additionally envisioned that the system and method can be employed with abrasive slurries, including both non-conductive and spark conductive types, as well as polishing or abrasive slurries combined with the EDM process described herein.

I claim:

1. A system for accomplishing combined electro-erosion and mechanical cutting of a workpiece having an outer metallic jacket and a non-metallic inner core, said system comprising:

an elongated wire electrode having a specified polygonal and cross sectional shape with a textured outer surface;

at least a first pair of feed rollers located to one side of the workpiece and a second pair rollers located to the other side, said electrode being guidably extended between each of said pairs of rollers;

an electrical current generating and delivery component in communication with said wire electrode, through at least one of said rollers, and such that said electrode exhibits current carrying and electro-erosive capability when arranged in proximity to the outer metallic jacket of the workpiece; and said textured surface of said electrode further exhibiting mechanically abrasive properties when advanced longitudinally in relation to the inner core of the workpiece and in order to cut through and section the inner core.

2. The system as described in claim 1, further comprising a reel spool containing a wound quantity of said elongated wire electrode.

3. The system as described in claim 2, further comprising a pair of forming rollers such that, upon said wire electrode unreeling from said reel spool and passing through said forming rollers, said forming rollers imparting said specified polygonal cross sectional shape and said textured outer surface.

4. The system as described in claim 3, said specified cross sectional shape of said wire further comprising a triangular shape, said textured outer surface further comprising teeth imparted by said forming rollers upon said outer surface of said electrode.

5. The system as described in claim 3, said first pair of rollers further comprising feed rollers and said second pair of rollers further comprising take-up rollers.

6. The system as described in claim 5, further comprising a take-up spool for rewinding a used quantity of said wire electrode.

7. The system as described in claim 6, a pair of pulling pinch rollers being arranged between said take-up rollers and said take-up spool and through which wire electrode is guidably received.

8. The system as described in claim 7, further comprising tensioning members located on both feed and take-up sides of said wire electrode.

9. The system as described in claim 8, said tensioning members further comprising a first potentiometer roller arranged between said reel spool and said forming rollers, a second potentiometer roller being arranged between said take-up rollers and said pulling pinch rollers.

10. The system as described in claim 1, further comprising a fluidic and die-electric located between said wire electrode and the workpiece.

11. The system as described in claim 1, said system further comprising an advancing head mechanism for actuating said wire electrode in a direction substantially perpendicular to an extending length across a machining zone defined in relation to the workpiece.

12. The system as described in claim 11, said wire electrode further comprising an outer layer constructed of a first and softer metallic material and an inner layer constructed of a second and harder metallic material in relation to said outer layer.

13. The system as described in claim 12, said outer layer further comprising brass and said inner layer further comprising steel.

14. The system as described in claim 11, said advancing head mechanism having a specified shape and size, the workpiece further being an explosive shell filled with an RDX explosive aggregate, a detonator being located at an extending end of the shell.

15. A method for accomplishing combined electro-erosion and mechanical cutting of a workpiece having an outer metallic jacket and a non-metallic inner core, said method comprising the steps of:

unreeling a supply of an elongated wire electrode;

forming a specified polygonal and cross sectional shape of said electrode, said step of forming further comprising the step of texturing an outer surface of said electrode;

guidably advancing, in longitudinal fashion, said wire electrode across a machining zone defined between said wire electrode and the workpiece;

supplying an electrical current to said wire electrode to create an electrical arc within said machining zone, between said electrode and the workpiece, and in order to electro-erode the outer metallic jacket; and sectioning the non-metallic inner core of the workpiece upon the advancement and abrading of said textured outer surface of said wire electrode against the inner core.

16. The method as described in claim 15, further comprising the step of tensioning said wire electrode on both of feed and take-up sides relative to said machining zone.

17. The method as described in claim 15, the step of forming a polygonal and cross sectional shape of said electrode further comprising a triangular shape.

18. The method as described in claim 17, said step of texturing said outer surface of said electrode further comprising forming a plurality of teeth thereupon.

19. The method as described in claim 15, further comprising the step of immersing said machining zone with a dielectric fluidic bath.

20. The method as described in claim 15, further comprising the step of advancing said wire electrode in a direction substantially perpendicular to an extending length across said machining zone and in relation to the workpiece.

21. A system for providing combined electroerosion and mechanical cutting of a workpiece having a first conductive layer and a second sandwiching and nonconductive layer, said system comprising:

an elongated wire electrode having a specified polygonal and cross sectional shape with a textured outer surface;

at least a first pair of feed rollers located to one side of the workpiece and a second pair rollers located to the other side, said electrode being guidably extended between each of said pairs of rollers;

an electrical current generating and delivery component in communication with said wire electrode, through at least one of said rollers, and such that said electrode exhibits current carrying and electro-erosive capability when arranged in proximity to the first conductive layer of the workpiece; and said textured surface of said electrode further exhibiting mechanically abrasive properties when advanced longitudinally in relation to the second nonconductive layer of the workpiece and in order to cut through and section the second layer.

* * * * *